United States Patent [19]

Mock

[11] Patent Number: 4,516,603

[45] Date of Patent: May 14, 1985

[54] CONTROL ARMATURE INSERTED IN THE FLOW ROUTE OF A SYSTEM FOR TRANSFERRING PRESSURE MEDIA IN A GASEOUS AND/OR LIQUID GASEOUS STATE

[76] Inventor: Bruno A. Mock, Wylstr. 15, 6052 Hergiswil, Switzerland

[21] Appl. No.: 509,257

[22] Filed: Jun. 29, 1983

[30] Foreign Application Priority Data

Aug. 16, 1982 [CH] Switzerland ........................ 4888/82

[51] Int. Cl.3 ........................ F16K 37/00; F16K 1/00

[52] U.S. Cl. .................................. 137/559; 137/861; 62/292

[58] Field of Search .................. 62/292; 137/559, 861

[56] References Cited

U.S. PATENT DOCUMENTS

| | | | |
|---|---|---|---|
| 3,208,232 | 9/1965 | Madison et al. | 62/292 |
| 3,232,070 | 2/1966 | Sparano | 62/292 |
| 3,302,421 | 2/1967 | Karnes | 62/292 |
| 3,785,163 | 1/1974 | Wagner | 62/292 |
| 4,092,865 | 6/1978 | Strybel | 137/861 |
| 4,110,998 | 9/1978 | Owen | 62/292 |
| 4,363,222 | 12/1982 | Cain | 62/292 |

*Primary Examiner*—A. Michael Chambers

*Attorney, Agent, or Firm*—Karl F. Ross; Herbert Dubno

[57] ABSTRACT

The control armature comprises a low-pressure side suitable for connection on a vacuum pump and a high-pressure side suitable for connection on a supply container for pressure medium. Whereby the connecting conduit on the low-pressure side between the shut-off valve of the intake connecting piece and the shut-off valve of the pump connecting piece as well as the connecting conduit on the high-pressure side between the shut-off valve of the pressure-media-inlet connecting piece and the shut-off valve of the pressure-media-outlet connecting piece are in flow connection by way of a common conduit section in the armature casing, formed in each case by a junction curve for the respective connecting conduit, whereby the conduit section, formed by the junction curves, is at least partially in visual range of the sight glass. These measures permit precise observation of the process of flow on the low-pressure side as well as on the high-pressure side by means of a single sight glass. Furthermore, the flow connection between the low-pressure side and the high-pressure side permits the realization of, for example, the vacuum cleaning of the complete armature.

5 Claims, 2 Drawing Figures

CONTROL ARMATURE INSERTED IN THE FLOW ROUTE OF A SYSTEM FOR TRANSFERRING PRESSURE MEDIA IN A GASEOUS AND/OR LIQUID GASEOUS STATE

FIELD OF THE INVENTION

The present invention relates to a new and improved construction of a control armature (valve assembly) inserted in the flow route of a system for transferring pressure media in a gaseous and/or liquid state.

BACKGROUND OF THE INVENTION

More specifically, the invention relates to a control valve assembly having a low-pressure side suitable for connection with a vacuum pump or the like and a high-pressure side suitable for connection with a supply container containing a pressure medium, both pressure sides comprising a closable inlet connecting piece, the junction conduit thereof being in flow connection with a guage.

In many technical branches, for example refrigeration engineering, it is necessary to transfer pressure media in containers, whereby the latter are previously to be evacuated. Refrigerators and, in particular, motor car air-conditioning systems, for instance, require for the initial starting or after repair of the system a charging of a cooling mixture, as a rule in the form of a liquified gas, in the circulation of the apparatus, for which this circulation has first to be evacuated.

In order that such process can be carried out in small workshops or even on the road, it is necessary for the mechanic concerned to be able to use a control valve assembly that permits the precise observation of this relatively dangerous transferring process.

Accordingly, a control valve assembly of the previously mentioned kind is available on the market, the armature casing thereof being divided into a low-pressure side for evacuating the system to be charged, and a high-pressure side for charging the system with gas. Here, the hand wheels of the shut-off valves on the system side are to be found in each case on the interface, and the hand wheels of the shut-off valves of the pump side or supply-container side are to be found on the front side of the armature casing.

The main disadvantages of these control valve assemblies is that the progress of flow in the assembly cannot be sufficiently supervised and, in particular, that there is no possibility of determining whether the flow routes or the medium being transferred are free from impurities. Moreover, the positioning of the hand wheels on the sides is less than satisfactory for easy manipulation.

OBJECTS OF THE INVENTION

It is a primary object of the present invention to provide an improved control valve assembly inserted in the flow rate of a system for transferring pressure media in a gaseous and/or liquefied gas state which is not associated with the aforementioned drawbacks and limitations of the prior art constructions.

Another and more specific object of the present invention is to provide a control valve assembly of the previously mentioned type in such a manner that previously mentioned drawbacks of the technical level are avoided and more control functions and better manipulability are attained.

SUMMARY OF THE INVENTION

These and still further objects of the invention, which will become more readily apparent as the description proceeds, are attained with a control valve assembly wherein the connecting conduit on the low-pressure side between a shut-off valve of an intake connecting piece and a shut-off valve of a pump connecting piece as well as the connecting conduit of the high-pressure side between a shut-off valve of the pressure-media-inlet connecting piece and a shut-off valve of the pressure-media-outlet connecting piece are in flow connection by way of a common conduit section in the assembly casing or body, formed in each case with a junction curve for the respective connecting conduit, and the conduit section formed by the junction curves is at least partially viewable through a sight glass mounted on this casing.

This allows the progress of flow of the low-pressure side and that of the high-pressure side to be precisely observed through a single sight glass, whereby, for example, any appearance of impurities, in particular in the flow of the pressure medium, can be recognized immediately. In addition, the flow connection between the low-pressure side and the high-pressure side permits the realization of, for instance, the vacuum cleaning of the complete armature by simultaneous evacuation of the system when, for example, the pressure-media-inlet connecting piece and the pressure media outlet connecting piece are connected by means of a loop line, and the valves opened accordingly. This can, for instance, be carried out prior to every transfer process and also for the complete drying of the flow routes in the valve assembly when work has to be carried out in conditions where high atmospheric moisture is prevalent, this process would prevent the penetration of water of condensation from the valve assembly side into the system to be charged.

For a troublefree manipulation of the control valve assemly according to the invention, the regulating knobs of the shut-off valves and the sight glass are located on the front of the armature casing.

Furthermore, the scope of application of the control armature according to invention can be increased in that secondary connecting pieces provided with connecting means project outwardly from each shut-off valve, whereby it is of advantage when the secondary connecting pieces of the low-pressure side as well as the secondary connecting pieces of the high-pressure side are situated on the sides of the armature casing.

These secondary connecting pieces permit, among other things, the connection of another system to be charged, or the direct connection onto the vacuum pump and/or onto the pressure medium supply container, or the application of loop connections between these and the other connecting pieces.

BRIEF DESCRIPTION OF THE DRAWINGS

The invention will be better understood and objects other than those set forth above, will become apparent when consideration is given to the following detailed description thereof, with reference to the accompanying drawings wherein.

SPECIFIC DESCRIPTION

Figure 1:
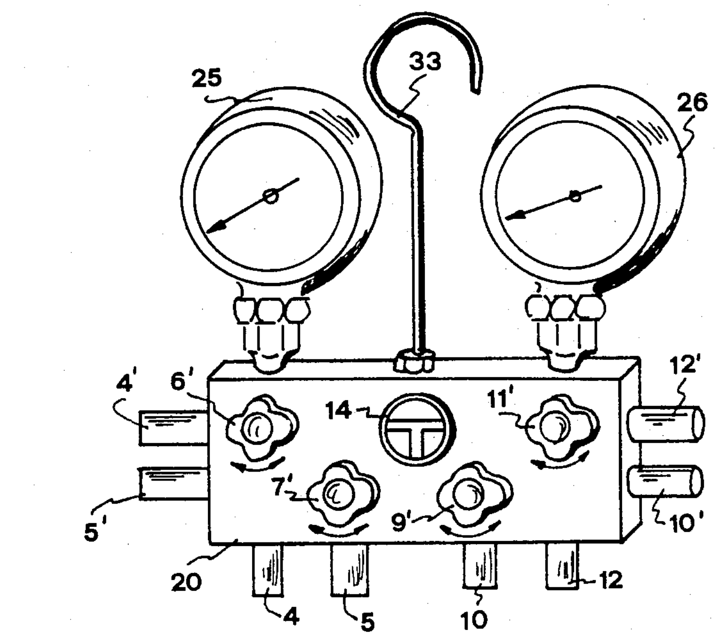
FIG. 1 is a diagrammatic representation of a control valve assembly insertable in the flow route of an apparatus for transferring pressure media in a gaseous and/or a liquefied gas state.
Figure 2:
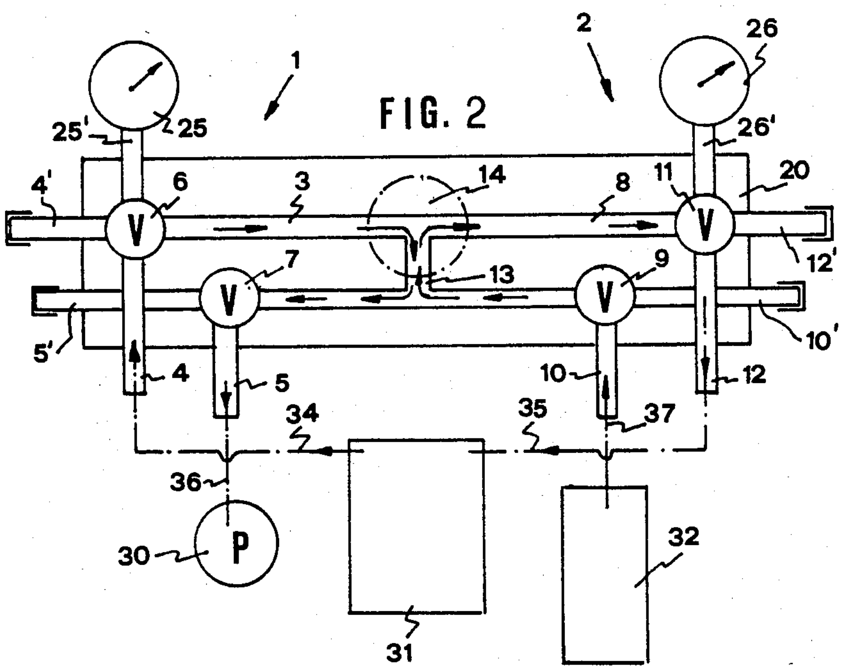
FIG. 2 is a flow diagram showing principles and functions of the control valve assembly according to FIG. 1.

The control valve assembly illustrated comprises a casing 20 with a high pressure side 2. The control valve assembly serves here the purpose of controlling the process of transferring a refrigeration medium in the form of a liquefied gas from a charging cylinder aggregate 32 in the circulation of an air-conditioning system or a refrigerator 31, as well as the control of the evacuation of this circulation system 31 by means of a vacuum pump 30 in the manner described below. It is to be said herein, however, that the control valve assembly according to invention can also be utilized for the control of other flow processes.

The control valve assembly according to the invention comprises on the low-pressure side 1 in the first instance a pump connecting means 5 suitable for connection with a vacuum pump 30 by means of a supply means 36 as well as an intake connecting piece 4 suitable for connection with the circulation system 31 by way of a supply line 34, which controlled by shut-off valves 6 and 7 respectively and the valve 6 is in flow connection with a compound gauge by way of a connecting piece 25′. In a similar way, the high-pressure side 2 comprises a pressure-outlet connecting piece 12 connected with the circulation flow 31 by way of a supply line 35, as well as a pressure inlet connecting piece 10 connected with the charging cylinder aggregate 32 by way of a supply line 37; the lines 10 and 12 are controlled by shut-off valves 9 and 11, respectively, and a connection piece 26′ connects valve 11 to a charging gauge 26.

As shown in particular in FIG. 1, the regulating knobs 6′, 7′, 9′ and 11′ of the respective shut-off valves 6,7, 9 and 11 are all arranged on the face of the valve assembly casing 20, being consequently easily accessible. The said connecting pieces 4,5,10 and 12, on the other hand, project from the lower narrow side, and the gauges 25 and 26 project from the upper narrow side of the valve assembly casing. Between the gauges is a hook 33 which is connected to and extends from the valve assembly casing 20, permitting the control to be suspended from any place as may be desired.

An essential feature according to invention can be seen in that the connecting conduit 3 on the low-pressure side 1 between the shut-off valve 6 of the intake connecting piece 4 and the shut-off valve 7 of the pump connecting piece 5 as well as the connecting conduit 8 on the high-pressure side 2 between the shut-off valve 9 of the pressure-media-inlet connecting piece 10 and the shut-off valve 11 of the pressure-media-outlet connecting piece 12 are in flow connection by way of a common section 13 in the valve assembly casing 20, formed in each case by a junction curve for the respective connecting conduit 3 or 8. Hereby the arrangement is so chosen that the conduit section 13, formed by the junction curves, is at least partially in visual range of a sight glass 14.

Further to this, the illustrations show an additional feature according to invention in form of a sideways-projecting secondary connections 4′ and 5′ or 10′ and 12′ which each communicate with one of the shut-off valves 6,7,9 and 11 respectively.

The previously described control armature is in a position to fulfill every feasible function. In particular, it is now possible to observe the evacuation process as well as the charging process of the medium from the supply container 32 in the circulation system not only by means of the pressure readings of the gauges but also in the sight glass 14. Further, the measures concerned permit a plurality of connections of the arrangement as well as a vacuum cleaning of the complete armature by way of the junction curves, forming the section of the conduit 13, simultaneous with the evacuation of the individual connecting pieces by means of separate connecting pipes.

The result thereof is a robust, manageable and universally-useable control valve assembly.

Hereby various modifications within the bounds of the basic idea of the present invention are absolutely possible. Thus, for example, the secondary connecting pieces can be arranged on the face side and/or the sight glass can show a larger area of inner conduits than has been illustrated.

What I claim is:

1. A control valve assembly comprising:
   - a casing of generally prismatic shape having a front face;
   - a low-pressure fitting extending into said casing at a low-pressure side thereof and connectable to a suction pump;
   - a high-pressure fitting extending into said casing at a high-pressure side thereof and connectable to a source of pressure medium;
   - respective fittings connectable to a unit to be charged with said medium on said high-pressure and low-pressure sides of said casing;
   - first respective valves in said casing connected to each of said charging fittings;
   - a first conduit between the first valves connected to said fittings;
   - a second conduit between respective second valves connected to charging said high-pressure and low-pressure fittings;
   - a common connection between the first and second conduits forming respective T-junctions therewith; and
   - a sight glass in said face of said casing exposing to view at least the T-junction of said common connection with said first conduit, said common connection forming with said first-conduit a junction which curves at the latter T-junction.

2. The assembly defined in claim 1 wherein said casing has a rectangular parallelopipedal configuration and said fittings project from the same long side of said casing and said valves have regulating handles on said front face of said casing.

3. The assembly defined in claim 2 wherein a pair of gauges are connected to said valves of said charging fittings at the opposite long side of said casing.

4. The assembly defined in claim 3 wherein said respective pairs of auxiliary fittings project from opposite short sides of said casing and are connected respectively to the valves of the fittings on said low-pressure side and said high-pressure side respectively.

5. The assembly defined in claim 4, further comprising a hook connected to said casing between said gauges at said opposite long side of said casing.

* * * * *